United States Patent
Wagner et al.

(10) Patent No.: US 8,185,147 B2
(45) Date of Patent: May 22, 2012

(54) WIRELESS COMMUNICATION SYSTEM INTEGRATED INTO A COMPUTER DISPLAY

(75) Inventors: Matthew J. Wagner, Houston, TX (US); Robin T. Castell, Spring, TX (US); Timothy Neill, Houston, TX (US)

(73) Assignee: Hewlett-Packar Development Company, L.P., Houston, TX (US)

( * ) Notice: Subject to any disclaimer, the term of this patent is extended or adjusted under 35 U.S.C. 154(b) by 2980 days.

(21) Appl. No.: 10/034,224

(22) Filed: Dec. 28, 2001

(65) Prior Publication Data

US 2003/0125070 A1    Jul. 3, 2003

(51) Int. Cl.
*H04M 1/00* (2006.01)

(52) U.S. Cl. ............ 455/550.1; 455/556.1; 455/557; 455/575.7; 455/556.2; 455/101; 343/702; 343/873

(58) Field of Classification Search ......... 455/550.1, 455/556.1, 556.2, 557, 558, 90.3, 575.7, 455/101
See application file for complete search history.

(56) References Cited

U.S. PATENT DOCUMENTS

| | | | | |
|---|---|---|---|---|
| 5,799,068 A * | 8/1998 | Kikinis et al. | ............ | 379/93.06 |
| 5,844,985 A * | 12/1998 | Kulberg et al. | ......... | 379/433.13 |
| 5,850,612 A * | 12/1998 | Kulberg et al. | ............ | 455/575.7 |
| 5,861,873 A * | 1/1999 | Kikinis | ......................... | 345/157 |
| 5,913,174 A * | 6/1999 | Casarez et al. | ................ | 455/557 |
| 5,983,073 A * | 11/1999 | Ditzik | ......................... | 455/11.1 |
| 6,047,301 A * | 4/2000 | Bjorklund et al. | ............ | 708/139 |
| 6,115,762 A * | 9/2000 | Bell et al. | ......................... | 710/62 |
| 6,181,284 B1 * | 1/2001 | Madsen et al. | ................ | 343/702 |
| 6,259,932 B1 * | 7/2001 | Constien | ..................... | 455/556.1 |
| 6,356,442 B1 * | 3/2002 | Lunsford | ................. | 361/679.56 |
| 6,356,443 B2 * | 3/2002 | Jenks et al. | .............. | 361/679.56 |
| 6,434,403 B1 * | 8/2002 | Ausems et al. | ............ | 455/556.2 |
| 6,456,245 B1 * | 9/2002 | Crawford | ..................... | 343/702 |
| 6,531,985 B1 * | 3/2003 | Jones et al. | ..................... | 343/702 |
| 6,587,698 B1 * | 7/2003 | Dosch | ........................... | 455/558 |
| 6,628,236 B2 * | 9/2003 | Kim et al. | ..................... | 343/702 |
| 6,677,906 B2 * | 1/2004 | Quinn et al. | ................... | 343/702 |
| 6,757,551 B2 * | 6/2004 | Newman et al. | ............ | 455/556.1 |
| 6,862,433 B2 * | 3/2005 | Callaway, Jr. | ................. | 455/101 |
| 6,885,880 B1 * | 4/2005 | Ali | ............................. | 455/575.7 |
| 7,068,621 B2 * | 6/2006 | Bouet et al. | ................... | 370/328 |

* cited by examiner

*Primary Examiner* — Marceau Milord

(57) ABSTRACT

An electronic device has a display in which the casing of the display includes a plurality of recessed cavities into which radio and antenna modules can be inserted to provide the electronic device with a wireless communication capability. The display can have cavities for one or more radios and one or more antenna modules. A radio electrically connects to one or more antenna modules via conductor(s) contained within the display and connects to the host electronic device via a serial bus (e.g., USB). Accordingly, the display can have a plurality of radio/antenna combinations thereby concurrently providing the electronic device with multiple wireless communication capabilities.

13 Claims, 2 Drawing Sheets

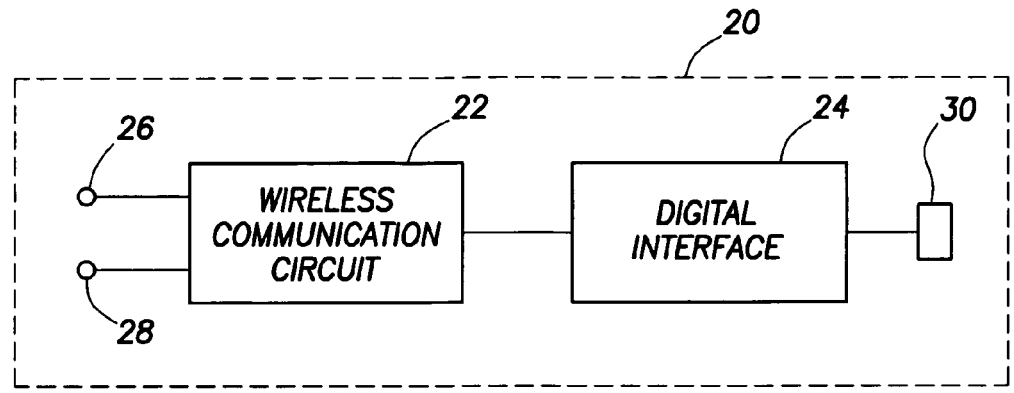
FIG. 1
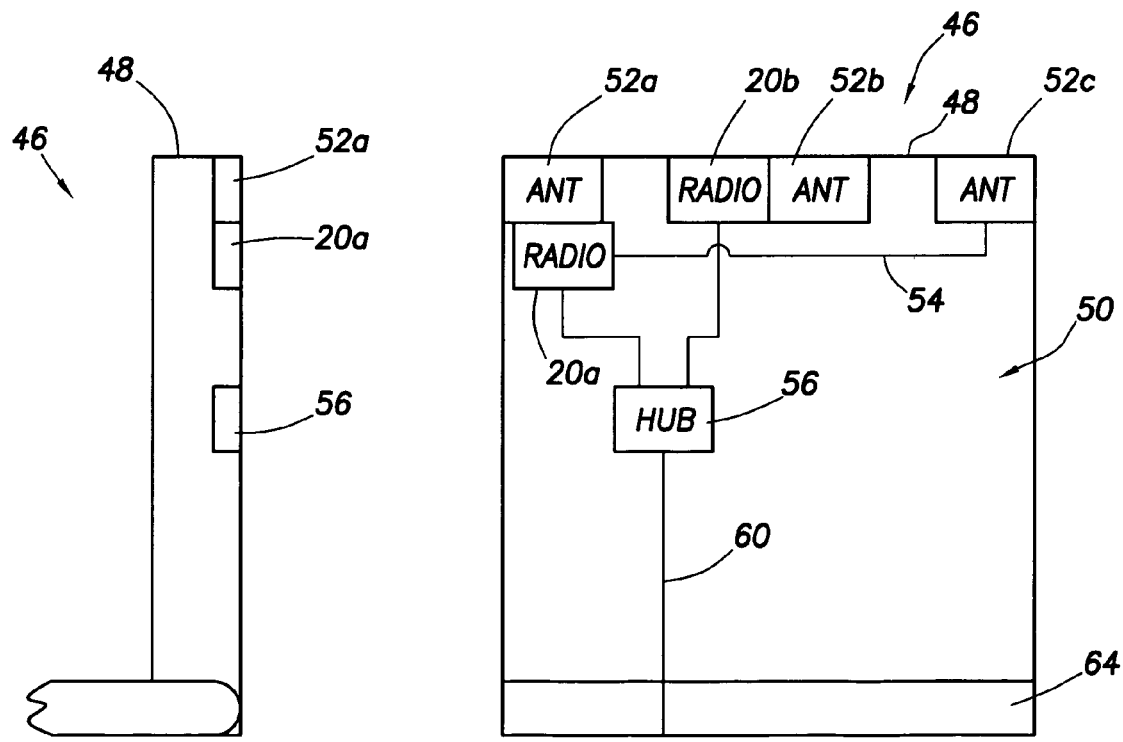
FIG. 4                    FIG. 3

WIRELESS COMMUNICATION SYSTEM INTEGRATED INTO A COMPUTER DISPLAY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a technique for incorporating a wireless communication capability into an electronic system. More particularly, the invention relates to a communication transceiver and an antenna integrated into a computer display. Still more particularly, the invention relates to integrating a plurality of radio modules and antenna modules into the outer surface of the display.

2. Background of the Invention

The market for wireless portable electronic devices (e.g., laptop computers, personal data assistants, etc.) is experiencing tremendous growth. A wireless device typically includes a radio receiver or transceiver device coupled to an antenna. Currently, there are several implementations of wireless technology in an electronic device. Examples of wireless technologies include GSM in Europe and AMPS, CDMA, and TDMA in North America, as well as Bluetooth and IEEE 802.11.

One such wireless implementation includes a circuit card that contains the radio electronics mounted on the card. In the context of a laptop computer, the radio card may be manufactured according to the well-known PCMCIA card standard and plug into the back or side of the laptop. The antenna associated with the radio card typically protrudes from the card and out the back or side of the laptop. This type of implementation is generally satisfactory, but suffers several limitations. First, the protruding antenna is susceptible to being knocked and damaged. Second, the antenna may not be located in such a way to provide the most optimal reception. Sub-optimal reception may be caused by the antenna being located relatively low in relation to the laptop. Further, because the antenna is located in close proximity to the laptop's components (e.g., processor, hard drive, floppy drive, etc.), electromagnetic interference from such components may interfere with the signals being received or transmitted by the radio's antenna.

Another type of wireless implementation includes a self-contained communication module that attaches to the back of the laptop's display. An example of this type of implementation is Compaq Computer Corp.'s Multiport Module. This module includes a radio circuit and an antenna. The rear surface of the display includes a mechanical provision to which the module can be mated. An electrical blind-mating connector also is included thereby providing an electrical connection point for the module. Through this connector, the module couples to circuitry in the computer using an electrical standard such as Universal Serial Bus ("USB"). This type of arrangement generally better situates the antenna for improved performance relative the card mounted radio with antenna protruding therefrom.

Both of these arrangements suffer from at least the following problem. That problem is that in either case the wireless electronic device is outfitted generally with only a single wireless technology. That is, only a single Multiport Module can be mated to the back of the display and only one radio card generally is inserted into a card slot at a time. The user may have a desire or need to use more than one wireless technology. For example, the user may wish to use a Bluetooth-based radio while at work, but use a cellular-based communication technology while away from the office. Such a user would have to switch out Multiport modules or radio cards when desiring to switch wireless capability. Of course, this also means that the user would have to carry the extra modules or cards and have the ability and inclination to switch out the hardware. While Multiport modules are relatively easy to change out, circuit cards are much more cumbersome to remove and replace. Accordingly, a solution to this problem is desirable.

BRIEF SUMMARY OF THE INVENTION

The problems noted above are solved in large part by an electronic device, such as a notebook computer or a handheld computer, having a display. Preferably, the casing of the display includes a plurality of recessed cavities into which radio and antenna modules can be inserted. The modules insert, for example, by snapping them in place in a corresponding cavity. The modules may have blind mating electrical connectors to provide electrical connection points. The radio modules preferably connect via a serial bus (e.g., USB) to the host electronic device.

The display can have cavities for one or more radios and one or more antenna modules. A radio electrically connects to one or more antenna modules via conductor(s) contained within the display. Accordingly, the display can have a plurality of radio/antenna combinations thereby concurrently providing the electronic device with multiple wireless communication capabilities. The location of the cavities and wireless modules is not limited just to the rear surface of the device's display. Any surface on, inside, or around the electronic device in which cavities can be formed or otherwise provided is acceptable.

The wireless communication subsystem described herein permits the radios and antennas to be located optimally for superior reception. Further, being able to include more than one wireless technology in the device at a time avoids the user from having to swap out wireless electronics as the need arises to switch from one wireless technology to another. These and other advantages will become apparent upon reviewing the following disclosure.

BRIEF DESCRIPTION OF THE DRAWINGS

For a detailed description of the preferred embodiments of the invention, reference will now be made to the accompanying drawings in which:

FIG. 1 shows a block diagram of the radio module in accordance with a preferred embodiment of the invention;

FIG. 3 shows a plan view of the rear surface of a portable computer display into which multiple radio and antenna modules are inserted and interconnected;

FIG. 4 shows a side view of the display of FIG. 2; and

NOTATION AND NOMENCLATURE

Figure 2:
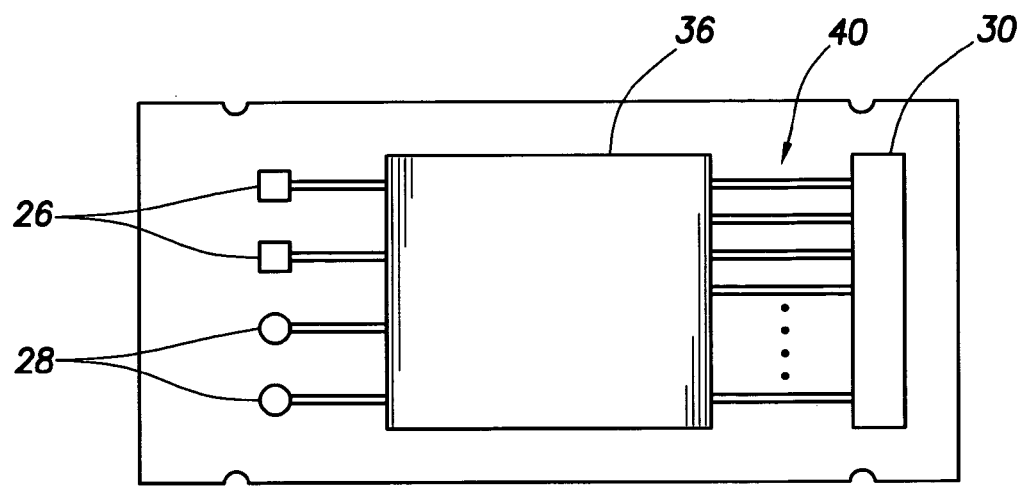
FIG. 2 shows layout view of the radio module of FIG. 1.

Certain terms are used throughout the following description and claims to refer to particular system components. As one skilled in the art will appreciate, computer companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect electrical connection. Thus, if a first device couples to a second device, that connection may be through a direct electrical connection, or through an indirect electrical connection via other devices and connections. To the extent that any term is not specially defined in this specification, the intent is that the term is to be given its plain and ordinary meaning.

DETAILED DESCRIPTION OF THE PREFERRED EMBODIMENTS

FIG. 1 shows an electrical block diagram of a radio module 20 constructed in accordance with a preferred embodiment of the invention. As shown, the radio module includes a wireless communication circuit 22 coupled to a digital interface 24. The wireless communication circuit 22 also couples to one or more antennas via antenna connections 26 and 28. The digital interface 24 couples to other logic (not shown) via connector 30. Such other logic to which the digital interface couples preferably includes a host computer system, which may be a desktop computer, notebook computer, handheld computer, cellular telephone, and the like.

The wireless communication circuit 22 preferably implements any suitable type of wireless communication technology. A non-exhaustive list of examples includes 802.11a, 802.11b, Bluetooth, CDMA IS95, CDMA 2000 1XEV, WCDMA, EDGE, and GPRS. The wireless communication circuit receives signals from an associated antenna, processes the signals (e.g., amplification, filtering, demodulation, etc.) and provides the processed antenna signal to the digital interface 24. The digital interface converts the processed antenna signal to a digital format and transfers the digital signal through connector 30 to a host computer (not shown). The radio module 20 shown in FIG. 1 preferably is bi-directional which means communication signals flow from another signal source, through the antenna, wireless communication circuit 22, digital interface 24 and to the host computer, as well as in the opposite direction from the host computer the radio module 20 and to an associated antenna. This permits two-way communications for voice, video, data and, in general, any type of communications that benefit from two-way communication. Alternatively, the communication may be simply a one-way communication path from an external source, through the radio module 20 and to the host computer or from the host computer through the radio module 20 to an external receiving device.

Referring now to FIG. 2, a mechanical layout of the radio 20 is shown. The module includes a printed circuit board 34 on which the wireless communication circuit 22 and digital interface 24 are mounted (collectively depicted as electronics 36 in FIG. 2). Antenna connections 26 and 28 are shown connected to the electronics 36 by way of traces 38. Preferably, connections 26 are conductive pads and connections 28 are connections for coaxial RF connectors. Connector 30 also is shown connected to electronics 36 by way of traces 40.

FIG. 3 shows a preferred embodiment of a computer system 46 including the radio module 20. The computer system shown in FIG. 3 comprises a notebook computer having a display 48 and other components that are not explicitly shown such as a keyboard, a microprocessor and other components. As noted above, the wireless subsystem described herein can be adapted for use on a variety of electronic device such as a desktop computer, notebook computer, handheld computers, cellular telephones, and the like. FIG. 3 shows the rear surface 50 of the casing of the notebook computer's display 48. The rear surface 50 is the surface opposite the viewable portion of the display. As shown, one or more radio modules 20 and antenna modules 52 preferably attach to the rear surface 50 of the display 48. The modules preferably fit within corresponding cavities formed, or otherwise provided, in the casing of the display. The modules may friction fit in the cavities and/or snap into place using mechanical protrusions on the modules that click into corresponding catch points in the cavities.

Although two radio modules 20 are shown, any number (one or more) can be included. Similarly, although three antenna modules are shown, any number (one or more) can be included. The antenna modules 52 comprise a suitable antenna element which is connected to an associated radio module 20. In general, of course, the antenna modules are designed to be used with the radios to which they connect.

A radio module 20 may connect to only one antenna module 52 if desired or connect to two or more antenna modules 52. Two antenna modules connected to a single radio module may be desired in accordance with various wireless technologies for improved "diversity." This permits a radio 20 to select the strongest signal from the associated antennas or to process the signals from both antennas so as to improve the quality of the reception. As shown, radio 20a couples to antenna 52a and 52c, while radio 20b couples to antenna 52b. As shown in FIG. 3 and discussed in more detail below regarding FIG. 5, conductor 54 is used to interconnect radio 20a to antenna module 52c and is contained within the display's casing.

The radios 20 couple via their digital interfaces 24 (FIG. 1) to electronics in the host computer 46. In accordance with a preferred embodiment of the invention, the digital interfaces comprise universal serial bus ("USB") interfaces. The radios 20a and 20b may couple to the host computer via a USB hub 56. The conductors 60 from the hub 56 to the host system are routed through the hinge 64 at the bottom end 66 of the display. Routing signals through hinge 64 is certainly within the skill level of one of ordinary skill in the art. For reliability reasons, it is preferable to minimize the number of conductors that must be routed from the display 50, through the hinge 64 and to the processor portion of the notebook computer 46. Accordingly, the USB bus is desirable because, as a serial bus, it requires relatively few signal conductors. In general, any topology can be used to couple the radio modules 20 to the host computer, but serial topologies are preferred.

Each radio module 20, antenna module 52, and, if included, hub 56, is configured to be mated with, or into, the rear surface 50 of the display 48. The modules 20, 52 preferably snap into corresponding receptacles in the rear surface of the display. FIG. 4 shows a side view of the display 48 of the computer system 46. The radio modules 20, antenna modules 52 and hub 56 preferably reside with receptacles in the display so that they do not protrude much, if any at all, from the rear surface 50 of the display. Preferably, the modules and hub are flush with the outer surface of the display's casing.

There are several advantages to the arrangement shown in FIG. 3. One advantage is that more than one wireless communication capability can be included in the computer at a time. Thus, radio 20a could be a Bluetooth module while radio 20b could be a CDMA module. As such, the user need not swap out one radio and antenna for another as the need arises to use a different wireless technology. Application software inside the computer can be pre-configured to use a particular radio 20. Further, the antennas and associated radios can be located for improved signal reception compared to the radio and antenna being implemented in a circuit card located in processor portion of the computer. Also, in some situations, it is desirable to locate the antenna more than one quarter wave length from the radio to which it connects and this is possible with the configuration of FIG. 3. This is in contrast to the Multiport configuration discussed above in which the antenna and radio are provided in close proximity in a common enclosure. By separating the antenna from its radio, the wireless capability is able to achieve better spatial diversity than is generally possible with the Multiport design. In addition, being generally flush with the rear surface 50 eliminates the potential for the components 20, 52 and 56 to be accidentally bumped and damaged.

Figure 5:
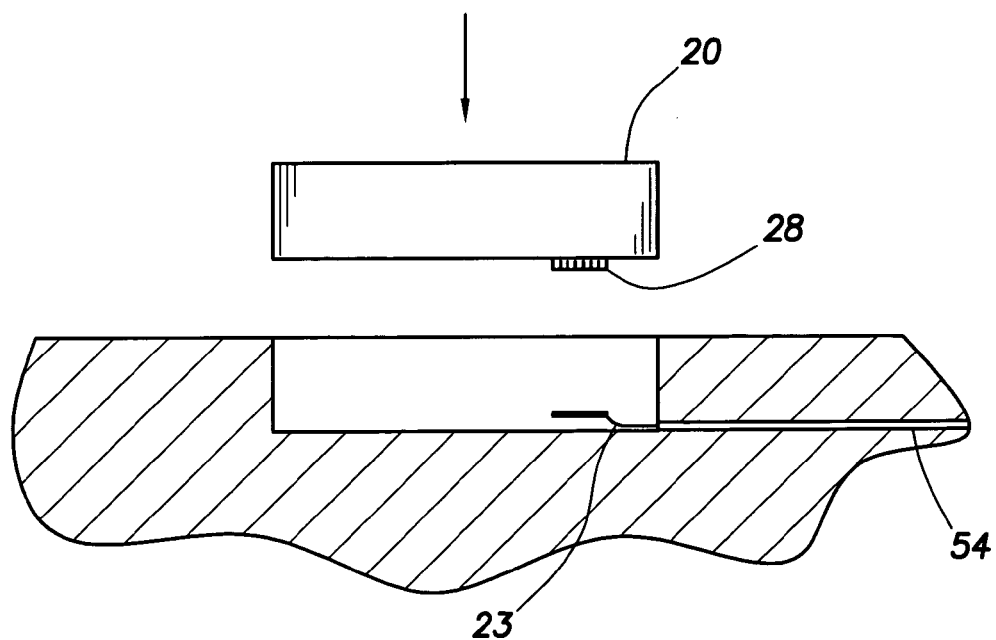
FIG. 5 shows an embodiment of how the radio and antenna modules can be electrically connected together.

The radios and antennas can be electrically interconnected in accordance with any one of a number of suitable connection mechanisms. In one embodiment, the radio module 20 and antenna module 52 can be connected via a suitable RF coaxial cable that is included within the display's casing and thus hidden from view. Either end of the coaxial cable preferably is soldered or otherwise attached to conductive pads associated with the radio and antenna modules. As shown in FIG. 5, for example, the ends of the coaxial cable can be formed into, or attached to, a spring-like conductive structure 23 that contacts electrical pads 28 on the radio module 20. Accordingly, when the radio module 20 is snapped into place in cavity 21, its pads 28 automatically line up with and contact the spring-like ends 23 of the coaxial cable 54. A similar arrangement is provided in the cavities of the antenna modules.

In accordance with another embodiment, the radio and associated antenna can be connected by conductive material other than a coaxial cable formed or otherwise attached to a structure inside the display casing. The conductive material, for example, could be a metal etched onto a plastic surface inside the display.

Further still, a radio and antenna module pair can be electrically connected directly (i.e., without the use of an interconnecting cable. For example, as shown in FIG. 3, radio 20a is shown essentially abutting antenna module 52a. Conductive spring-like "fingers" (not shown) from the antenna module can be routed through the display and over to the cavity occupied by the radio module. Thus, when the radio module is snapped into place, its contacts 26 (FIG. 2) line up and contact the conductive fingers from the antenna module in a similar fashion to that discussed above with regard to FIG. 5.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system, comprising:
a processor;
a display coupled to said processor, said display having an external casing in which a plurality of externally exposed recessed cavities are provided to receive a plurality of radio modules and a plurality of antenna modules, each radio module connected to a least one antenna module;
wherein at least one radio module is electrically connected to a plurality of antenna modules via a conductor contained within said casing.

2. The computer system of claim 1 wherein said radio module and antenna module are flush with the outer surface of the casing.

3. The computer system of claim 1 wherein each radio module is electrically connected to at least one antenna module via a conductor contained within said display casing.

4. The computer system of claim 1 wherein said plurality of radio modules is two radio modules and said plurality of antenna modules is three antenna modules.

5. The computer system of claim 1 wherein said radio module couples to other electronics in said computer system via a digital serial bus.

6. The computer system of claim 5 wherein said bus comprises a universal serial bus ("USB").

7. A display for an electronic device, said display having a casing containing a plurality of externally exposed recessed cavities formed therein into which a plurality of radio modules and a plurality of antenna modules can be removably inserted to provide a wireless communication capability for said electronic device, wherein at least one of the radio modules is electrically connected to a plurality of antenna modules via a conductor contained within said casing.

8. The display of claim 7 wherein said radio module and antenna module are flush with the outer surface of the display casing.

9. The display of claim 7 wherein each of the radio modules is electrically connected to at least one antenna module via a conductor contained within said display casing.

10. The display of claim 7 wherein said plurality of radio modules is two radio modules and said plurality of antenna modules is three antenna modules.

11. The display of claim 7 including a recessed cavity in said casing for a communication hub interconnecting said radio module to said electronic device.

12. The display of claim 7 wherein said electronic device comprises a notebook computer.

13. The display of claim 7 wherein said electronic device comprises a handheld computer.

\* \* \* \* \*

UNITED STATES PATENT AND TRADEMARK OFFICE
CERTIFICATE OF CORRECTION

| | | |
|---|---|---|
| PATENT NO. | : 8,185,147 B2 | Page 1 of 1 |
| APPLICATION NO. | : 10/034224 | |
| DATED | : May 22, 2012 | |
| INVENTOR(S) | : Matthew J. Wagner et al. | |

It is certified that error appears in the above-identified patent and that said Letters Patent is hereby corrected as shown below:

On the Title page, in field (73), Assignee, in column 1, line 1, delete "Packar" and insert -- Packard --, therefor.

In column 3, line 46, delete "the" and insert -- through the --, therefor.

In column 4, line 47, after "any" insert -- interconnection --.

In column 6, line 9, in Claim 1, delete 3rd occurrence of "a least" and insert -- at least --, therefor.

Signed and Sealed this
Twenty-fifth Day of December, 2012

David J. Kappos
*Director of the United States Patent and Trademark Office*